United States Patent
Prevor et al.

(10) Patent No.: US 10,232,812 B2
(45) Date of Patent: Mar. 19, 2019

(54) ADJUSTABLE LENGTH COMPLETE COVERAGE LICENSE PLATE BUMPER GUARD

(71) Applicants: Grant Eliot Prevor, Hoboken, NJ (US); Sunny Lam, Shanghai (CN)

(72) Inventors: Grant Eliot Prevor, Hoboken, NJ (US); Sunny Lam, Shanghai (CN)

(*) Notice: Subject to any disclaimer, the term of this patent is extended or adjusted under 35 U.S.C. 154(b) by 0 days.

(21) Appl. No.: 15/617,594

(22) Filed: Jun. 8, 2017

(65) Prior Publication Data

US 2017/0355334 A1 Dec. 14, 2017

Related U.S. Application Data

(60) Provisional application No. 62/347,457, filed on Jun. 8, 2016.

(51) Int. Cl.
| | |
|---|---|
| *B60R 19/50* | (2006.01) |
| *B60R 13/10* | (2006.01) |
| *B60R 19/44* | (2006.01) |

(52) U.S. Cl.
CPC .......... *B60R 19/50* (2013.01); *B60R 13/105* (2013.01); *B60R 19/44* (2013.01); *B60R 19/445* (2013.01)

(58) Field of Classification Search
CPC ..... B60R 19/50; B60R 19/445; B60R 13/105; B60R 19/44
USPC ........................................ 293/108, 117, 142
See application file for complete search history.

(56) References Cited

U.S. PATENT DOCUMENTS

| | | | | |
|---|---|---|---|---|
| 5,618,073 | A * | 4/1997 | Criscione | B60J 11/06 280/770 |
| D619,060 | S * | 7/2010 | Lorenzo | D12/171 |
| 7,866,715 | B2* | 1/2011 | Malina | B60R 19/44 293/117 |
| 9,937,883 | B2* | 4/2018 | Dagrossa | B60R 19/44 |
| 9,937,884 | B2* | 4/2018 | Dagrossa | B60J 11/06 |
| D819,528 | S * | 6/2018 | Dagrossa | D12/171 |
| 2015/0307046 | A1* | 10/2015 | Fritsch | B60R 19/44 293/144 |

* cited by examiner

*Primary Examiner* — Jason S Morrow
*Assistant Examiner* — E Turner Hicks
(74) *Attorney, Agent, or Firm* — Chambliss, Bahner & Stophel, P.C.

(57) ABSTRACT

A vehicle bumper guard assembly adapted for use on a vehicle having a license plate and a bumper. The preferred vehicle bumper guard assembly comprises a license plate frame having at least one frame attachment structure and being adapted to receive and retain the license plate. The preferred vehicle bumper guard assembly also comprises at least one lateral assembly having a first end, a second end, and at least one pad. In the preferred vehicle bumper guard assembly, the first end of the lateral assembly comprises a first lateral assembly attachment means adapted to be attached to the at least one frame attachment structure of the license plate frame, the second end of the lateral assembly comprises a second lateral assembly attachment means adapted to be attached to the vehicle, and the at least one pad is disposed adjacent to the bumper of the vehicle.

19 Claims, 5 Drawing Sheets

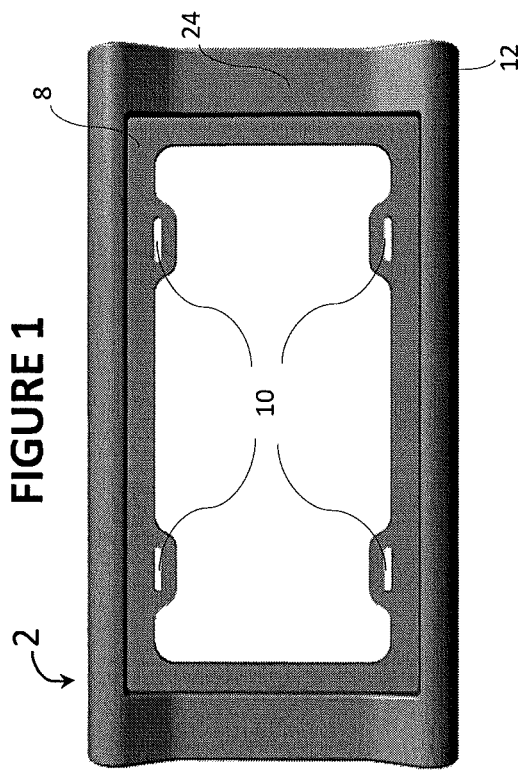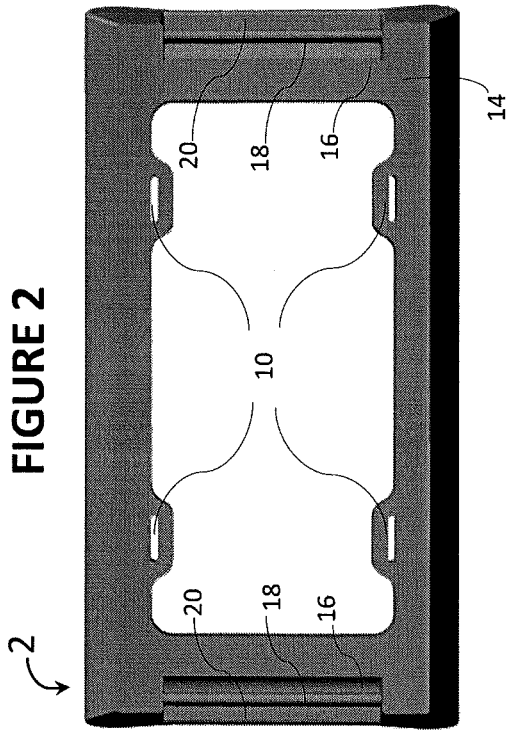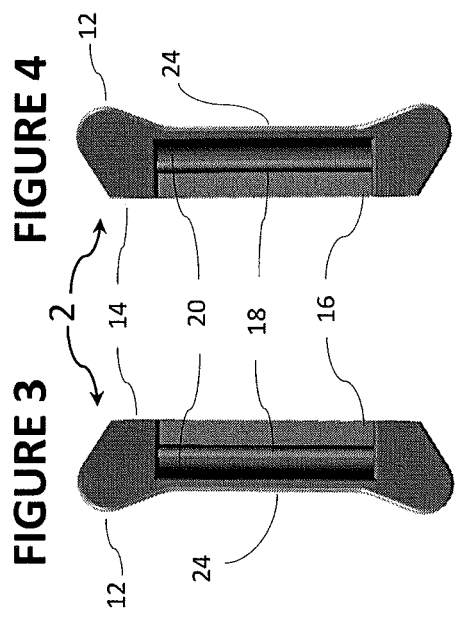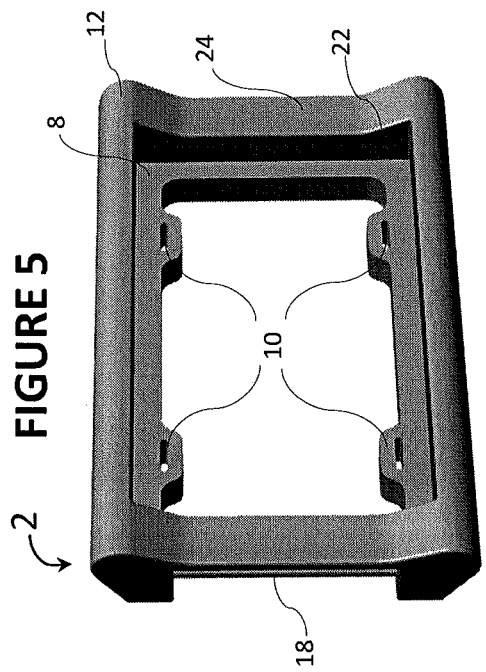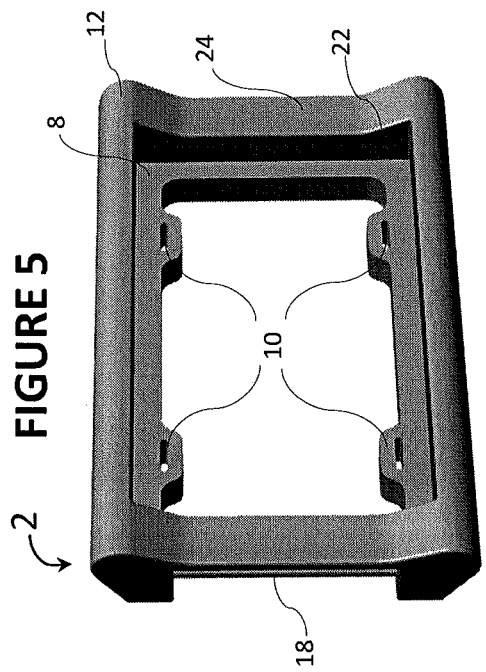

ADJUSTABLE LENGTH COMPLETE COVERAGE LICENSE PLATE BUMPER GUARD

CROSS-REFERENCES TO RELATED APPLICATIONS/PATENTS

This application relates back to and claims the benefit of priority from U.S. Provisional Application for Pat. Ser. No. 62/347,457 titled "Adjustable Length Complete Coverage License Plate Bumper Guard" and filed on Jun. 8, 2016.

FIELD OF THE INVENTION

The present invention relates to the field of vehicle bumper protection. Specifically it relates to a bumper protective license plate frame inventively shaped to easily and remove ably be attachable to protective side piece extensions. The assembly of which is meant to absorb minor impacts from vehicle to vehicle contact during parallel parking, thus preventing scratches, dings, and lacerations to a vehicle's delicate painted bumper surface. In particular it relates to a universal size, due to its cut-to-size adjustability, protective guard which is capable of covering and protecting nearly the entire surface of a typical passenger vehicle's front or rear bumper.

BACKGROUND AND DESCRIPTION OF THE PRIOR ART

As anyone who lives in a congested and overpopulated city can attest, parking is at a premium as of late in many neighborhoods. The lack of conveniently available and low or no-cost street parking spaces means people are parking literally on top of each other and cramming their cars into parking spaces too small to comfortably get in and out of.

As most street parking consists of parallel parking spots, a driver's parking skills and spatial judgement are put to the test daily and a vehicle's front and rear bumpers are often susceptible to contact with other parking or parked vehicles. Even the most skilled drivers, can misjudge or commit error when the available space and vehicle size are a close mismatch, leading to unwanted and often damaging vehicle to vehicle contact. This low velocity vehicle to vehicle contact is no longer a rarity, it occurs every day on every overly congested street where parking is at a shortage. It cannot therefore be regarded as accidental as the parking driver is well aware they are hitting stationary vehicles, sometimes multiple repetitive times, and generally their expected goal is to minimize contact and limit damage as opposed to genuinely expecting to avoid the parked cars altogether. In common slang this type of contact is referred to as a "love tap" denoting a non-intention to cause any harm but acknowledging the unavoidable necessity to make contact with the stationary vehicle or vehicles. Compounding the problem is the fact that the automobiles of today are being produced with light weight painted plastic bumper covers which are highly susceptible to damage from vehicle to vehicle contact during parallel parking. Although this damage is generally only paint damage and minor surface lacerations of the vehicle's plastic bumper cover, the accumulation of these minor scratches can strongly detract from a vehicle's overall appearance and cause the owner victim to either be unhappy with the appearance of their vehicle or force them to pay continuously for costly paint and surface repairs at a professional auto body shop. The high incidence of these minor parking incidents in major cities and areas where parking is at a premium, have led to the marketing of bumper protection guards.

Several products now exist and are growing in popularity for the protection of painted vehicle bumpers. For the rear bumper of the vehicle, the most popular by sheer number are essentially rubber mat shrouds which hang out of a vehicles trunk suspended by straps which adhere to the vehicles trunk carpet liner. These products are inexpensive and universal in size, yet they only protect the rear portion of the vehicle's bumper and thereby completely neglect the corners and sides of the bumper which are most highly susceptible to damage from parallel parking maneuvers. When a vehicle's license plate is mounted on the actual rear bumper of,the vehicle (not mounted on the vehicle's trunk), a rectangular hole or void in the guard to expose the license plate must be cut-out of the rubber mat shroud by the installer. The location of this hole is typically dictated by the guard's manufacturer, and does not always correspond properly to the best positioning for all vehicles (vehicles of different size, make and model have varying height and placement of their license plates), sometimes forcing the user to either partially obstruct their license plate or in an effort to not obstruct their license plate—not cover as much area of the bumper as they would have desired.

For the front bumper of the car many protective license plate frames exist and are popular. These are generally constructed of either rubber or a dense semi-rigid, energy-absorbing foam. They can typically extend off the face of the bumper by as much as 2.25 inches. These deeper products, although boasting the most protection, can often obstruct the visibility of the license plate from the sides and perspective angles of view. Although some are designed to be wider than typical license plate frames, their protection area is limited to the center of the bumper where the license plate resides. During parallel parking the angle of entry or exit of the parking space (generally around forty five degrees) makes the corners of the stationary car the first and most likely victim of initial "accidental" contact. Therefore, a vehicle's bumper is not fully protected when only the center rear of the vehicle is being covered by these popular rubber mat shrouds or the center front is only protected by a rubber/foam license plate frame.

Properly protecting a vehicles entire bumper is a challenge when convenience of use, aesthetics, and non-permanence of installation are all considered paramount design considerations. Other products which have been designed to cover the entire or most of the vehicles bumper, have failed to satisfy demanding consumer's preferences. Some available products must be purchased in limited available specific sizes (based upon the guards manufacturers' opinions of what constitutes a small, medium, or large vehicle), which does not ensure a desired custom fit length and truly guarantee the complete protection the consumer desires. The same style of "complete coverage" bumper cover when used for the front of the vehicle, requires that the license plate be removed and mounted atop the bumper guard which guarantees its secure connection to the vehicle using the license plate mounting screws—but makes removal difficult and cumbersome so they are impractical for regularly washing a vehicle. Not being able to easily remove the guard means that dirt trapped behind the guard remains there indefinitely causing scratching and damage to the paint. Those rubber mat shroud guards and other variations of guards that are easily removable, are also generally intended for use only once parked—they are intended and marketed only as "defensive", for the purpose of protecting a stationary vehicle from falling victim to another driver's "offensive" contact. The manufacturers of these guards specifically warn against driving the vehicle with these guards attached, as they have not been designed to be securely attached to the vehicle and cannot be safely used while driving the vehicle. Therefore, these products offer no protection for the offensive mobile vehicle which may itself be committing the offending contact while parking in a tight spot. Many of these products are also generally oversized, heavy, and bulky and take up too much trunk space when not in use, and for many users can be difficult to attach and detach from the vehicle without a second individual's assistance. Furthermore, as many of these products are designed for parking garage use and not for street parking or other outdoor use, their materials of construction are not intended to ever get wet from the rain limiting their benefit to a street parker.

ADVANTAGES OF THE PREFERRED EMBODIMENTS OF THE INVENTION

The intent of the present invention is to offer a bumper guard which:

Can protect nearly the entire bumper surface from low speed impacts during parallel parking thereby preventing scratches and paint damage from occurring.

Can be easily attached and detached from the vehicle by a single individual.

Can be easily custom sized and resized (re-usable on future cars) by the end-user (without the use of any tools or in-depth level of training) to offer complete bumper coverage for the majority of popular consumer automobiles on the market.

Can be securely attached to the vehicle and safe to drive with attached.

Can conform to the vehicle's unique contours and not detract from its stylish appearance.

Can be easily and compactly stored when not in use.

Can withstand the natural elements and be long lasting and durable.

Can be easily washed to keep its appearance always fresh and clean.

Can act as a canvas for sponsored advertising messages or personal adornment.

Additional advantages of the preferred embodiments of the invention will become apparent from an examination of the drawings and the ensuing description.

SUMMARY OF THE INVENTION

The apparatus of the invention comprises a vehicle bumper guard assembly adapted for use on a vehicle having a license plate and a bumper. The preferred vehicle bumper guard assembly comprises a license plate frame having at least one frame attachment structure and being adapted to receive and retain the license plate. The preferred vehicle bumper guard assembly also comprises at least one lateral assembly having a first end, a second end, and at least one pad. In the preferred vehicle bumper guard assembly, the first end of the lateral assembly comprises a first lateral assembly attachment means adapted to be attached to the at least one frame attachment structure of the license plate frame, the second end of the lateral assembly comprises a second lateral assembly attachment means adapted to be attached to the vehicle, and the at least one pad is disposed adjacent to the bumper of the vehicle.

BRIEF DESCRIPTION OF THE DRAWINGS

A more complete understanding of the present invention Adjustable Length Complete Coverage Bumper Guard License Plate Frame may be had by reference to the following detailed description when taken in conjunction with the accompanying drawings, wherein:

FIG. 1—is a front view of the license plate frame component of the present invention.

FIG. 2—is a rear view of the license plate frame component of the present invention.

FIG. 3—is a right side view of the license plate frame component of the present invention.

FIG. 4—is a left side view of the license plate frame component of the present invention.

FIGS. 5, 6, and 7—are perspective views of the front and side of the license plate frame component of the present invention at different angles of view.

Figure 6:
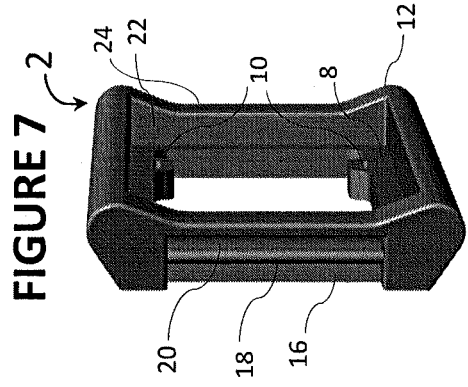
Figure 7:
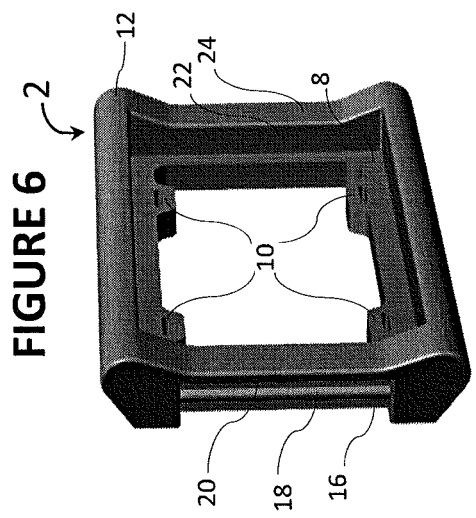
Figure 8:
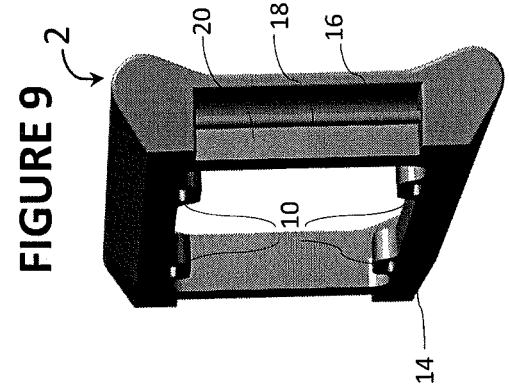
FIGS. 8 and 9—are perspective views of the rear and side of the license plate frame component of the present invention at different angles of view.
Figure 9:
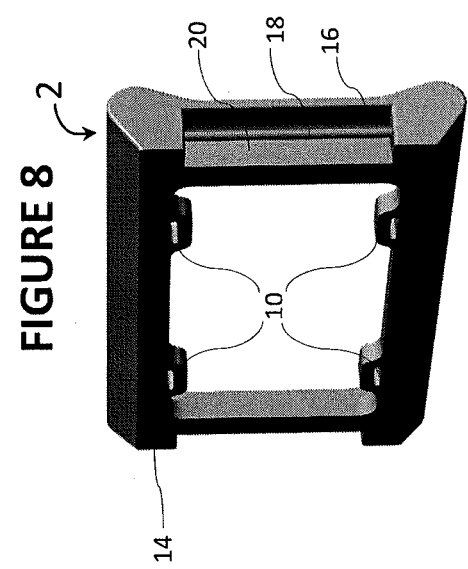
Figure 10:
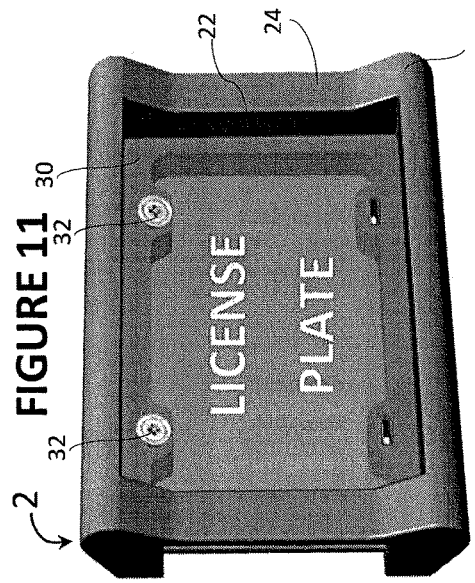
FIG. 10—is a front view of the license plate frame component of the present invention with a license plate installed.
Figure 11:
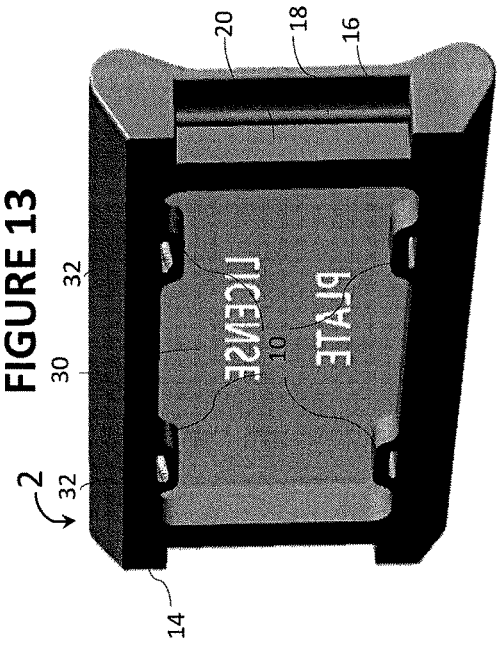
FIG. 11—is a perspective view of the front and side of the license plate frame component of the present invention with a semi-transparent license plate installed to better demonstrate how the license plate sits within the frame.
Figure 12:
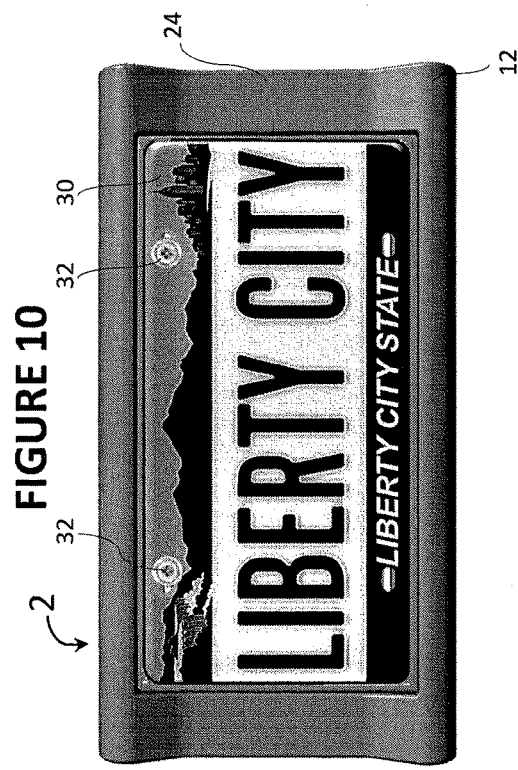
FIG. 12—is a rear view of the license plate frame component of the present invention with a license plate installed.
Figure 13:
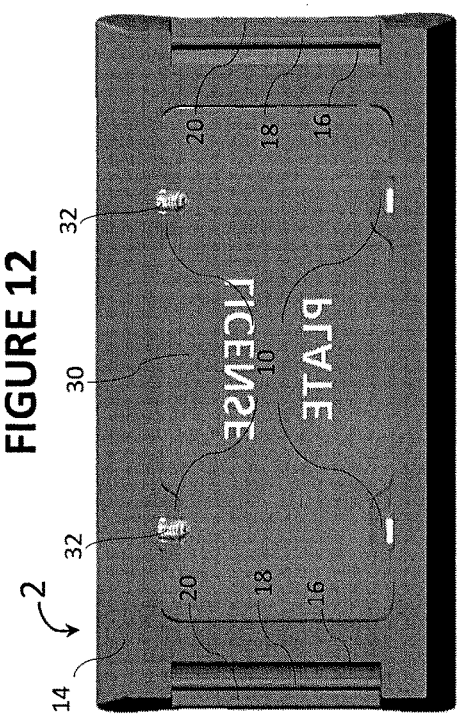
FIG. 13—is a perspective view of the rear and side of the license plate frame component of the present invention with a license plate installed.

Where used in the various figures of the drawings, the same numerals designate the same or similar parts. Furthermore, when the terms "front", "rear", "side", "top", "bottom", "first," "second," "upper," "lower," "height," "outer," "inner," "width," "length," "end", "horizontal", "vertical", and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific width, length, and similar requirements will likewise be within the skill of the art after the following teachings of the present invention have been read and understood.

Preferred embodiments of the Adjustable Length Complete Coverage Bumper Guard according to the present invention will now be described in detail with reference to the accompanying drawings.

DESCRIPTION OF THE PREFERRED EMBODIMENTS OF THE INVENTION

Figure 15:
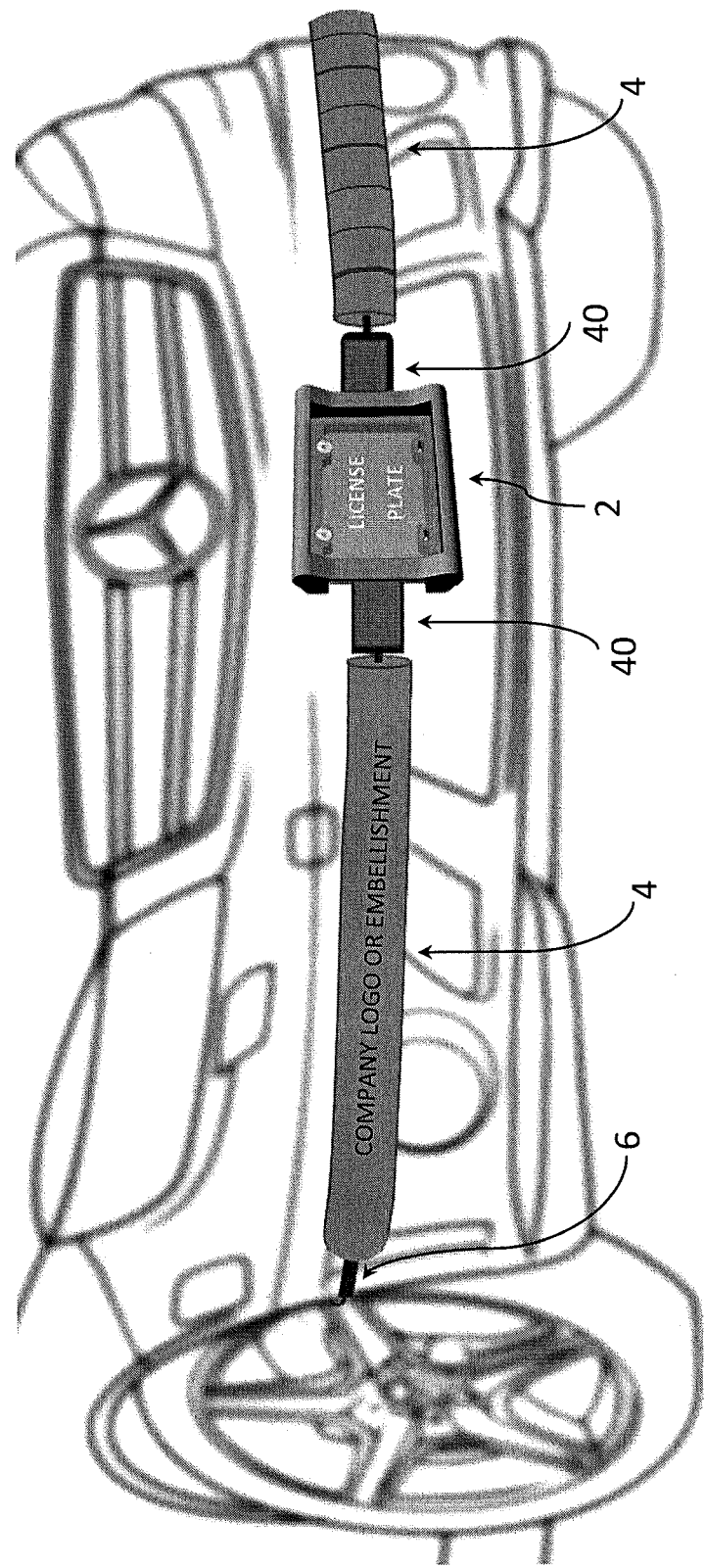
FIG. 15—illustrates the installed guard assembly on a vehicle's front bumper.

The present invention as illustrated in FIG. 15 relates to an adjustable in length vehicle bumper guard which protects the majority of a typical vehicle's front or rear bumper from minor abrasions and scratches inflicted by contact with other vehicles during parallel parking incidents. Several slightly distinct embodiments of the present invention are contemplated by the inventor. These embodiments take many forms and may appear visually different than the preferred embodiment uniformly and exclusively illustrated in the attached figures. The utility of the invention can best be explained by focusing attention to one specific preferred embodiment and making reference in some aspects to possible alternative variations of size, material composition, shape, and functionality. In the following described preferred embodiment, the Adjustable Length Complete Coverage License Plate Bumper Guard (hereinafter referred to as "guard") is capable of being custom sized to protect the entire front bumper of the majority of consumer automobiles driven in the United States and Canada today. The very same preferred embodiment may also be mounted and sized to properly cover a vehicle's rear bumper when such vehicle's license plate is mounted on the actual rear bumper center (many vehicles have their license plates mounted on the trunk of the vehicle and not on the actual bumper).

Figure 14:
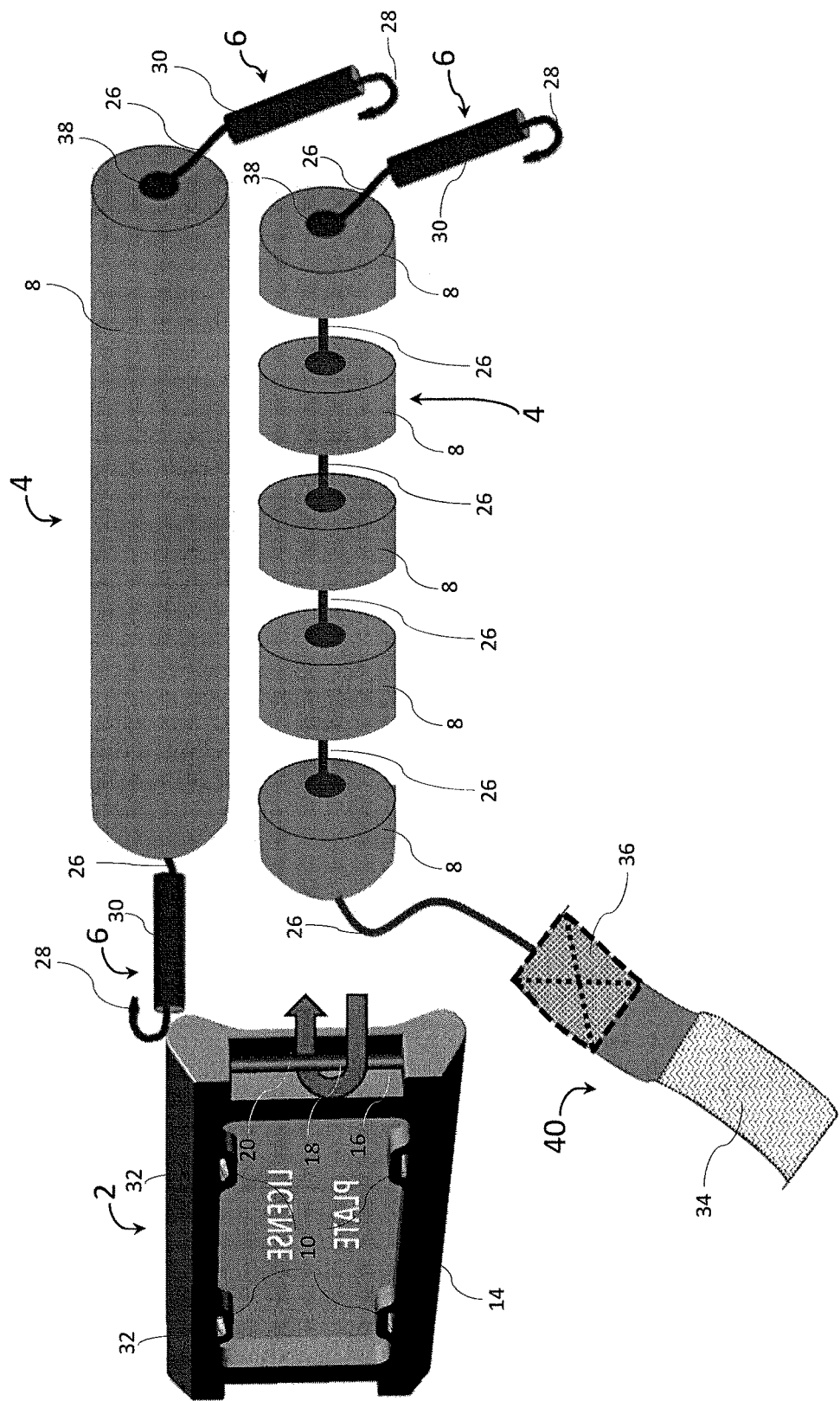
FIG. 14—illustrates the side piece extensions and how they attach to the license plate frame component.

The preferred vehicle bumper guard assembly is adapted for use on a vehicle having a license plate and a bumper. The preferred vehicle bumper guard comprises modular attachable components; namely, a license plate frame 2, at least one lateral assembly such as side piece extensions 4. The preferred license plate frame 2 comprises at least one frame anchor point or attachment structure such as posts 18, and the preferred at least one lateral assembly has a first end, a second end, and at least one pad 8. Preferably, the first end of the lateral assembly comprises a first lateral assembly attachment means adapted to be attached to the at least one frame attachment structure of the license plate frame, the second end of the lateral assembly comprises a second lateral assembly attachment means adapted to be attached to the vehicle, and the at least one pad is disposed adjacent to the bumper of the vehicle. Further, in the preferred vehicle bumper guard assembly, the distance between the first end and the second end of the at least one lateral assembly is adjustable and the assembly is adapted to extend along substantially the entire bumper of the vehicle. The two side piece extensions 4 are cut-to-size by the installer and ultimately positioned and attached to the license plate frame 2 (as illustrated in FIGS. 14 and 15) by either hooks 6 or straps 40 which remove ably anchor the two side pieces to the license plate frame 2.

The license plate frame 2 preferably comprises at least one raised portion, a means for attaching the license plate frame to the vehicle, a means for attaching the license plate to the vehicle, and may be constructed of rubber, silicone, or any semi-rigid energy absorbing foam material such as Polyurethane or Ethyl Vinyl Acetate or any other moldable or formable material which affords a flexible yet protective energy absorbing structure. The design of the frame 2 may have a substantially flat back side/rear surface 14 which will rest directly on the vehicle's surface or over an existing license plate mounting bracket when present on the vehicle. The design of the frame 2 may alternatively have a slightly contoured back side/rear surface to conform better to a rounded or contoured bumper profile. The design of the frame 2 may have in its center, a flat rectangular shaped, raised from the back side/rear surface 14, inner surface face layer 8 sized specifically for the placement and attachment of the license plate. Such a supportive and protective layer would keep the metal license plate distanced away from the bumper surface and ensure that the license plate itself does not get easily bent or racked as a result of minor vehicle to vehicle impacts. The contemplated thickness of the layer 8, from the flat back side/rear surface 14, will project the license plate further forward and away from the vehicle surface more than prior art license plate frames which mount atop the license plate (license plate directly in contact with the vehicle). In doing so the license plate will sit at a higher plane and will be more visible from the sides of the guard without sacrificing the protection the guard offers to the center of the bumper surface. The inner surface layer 8 and back side/rear surface 14 may have either two or four screw-hole lobes 10 with oval slits for the screws 32 to pass through and attach the license plate. The oval shape and orientation of the holes allows for horizontal adjustment of the screws 32 in order to use the vehicle's existing license plate holes when already present. Many vehicle manufacturers do not factory tap these holes as some states do not require front license plates. When required by the state the vehicle is sold in, car dealers may typically tap these holes. The standard in the United States is a 7" spread between holes, but this spread may vary from vehicle to vehicle by as much as 1".

The license plate is placed on the inner surface layer 8 and screwed 32 onto the vehicle through the holes in the lobes 10 using longer than standard license plate screws 32 due to the increased protective thickness of the lobes 10 design. The screw 32 heads are by design recessed in the structure of the license plate frame 2 by the depth of the side walls 22 which project off surface layer 8 in their flat centers 24 by a similar or same depth of material as surface layer 8 sits off of the vehicle. This ensures that the screws 32 and their projecting heads, do not scratch other vehicles during impacts. The flat center areas of the sides 24 in combination with the projected height of the inner surface layer 8 allow for clear visibility of the license plate from both left and right sides. From the top and bottom of the flat center 24 of the sides of the guard, the guard's sides taper upwardly (from the top) or downwardly (from the bottom) and outwardly and reach a maximum projection point at the front of the guard top or bottom 12. This maximum projection point 12 gives the guard its most protective impact points for contact with other vehicles and a pronounced protective appearance.

The license plate frame 2 is uniquely enabled with hidden from the front view, recessed anchor or attachment points such as post 18 on both of its sides. Preferred posts 18 are is disposed substantially vertically on a lateral side of the license plate frame. These anchor points could be molded into the shape of the material comprising the license plate frame 2 or inserted or excavated during or after the molding process. In one preferred embodiment post 18 could be constructed of stainless steel cylindrical rods embedded deep into the license plate frame material during the molding process. In other contemplated embodiments, these anchor or attachment points could instead be lobes or ears with holes or slits or attachment points extending outward from both sides of the molded license plate frame 2.

Preferred posts 18 could also be an exposed portion of an internal metal or rigid plastic frame embedded within the license plate frame 2 (similar to an internal skeleton giving the guard strength and solid anchor points) and covered by the foam or rubber. As in the illustrated preferred embodiment depicted in FIG. 14, a recessed "entry" point opening 16 on both sides of the flat back side/rear surface 14 would allow a connecting strap 40 which is permanently attached to one end of an elastomeric cord such as a bungee cord or elastic rope 26 (or a rope, ribbon, webbing, or wire) to pass through and engage or fold around posts 18 and then come out through a secondary "exit" point opening 20 closer to the middle of the guard's depth, yet concealed from view when looking at the frame head on. The strap 40 could be lined with hook and loop fasteners, male/hook fasteners 34 on one end and female/loop fasteners 36 on the other end. The strap 40 would therefore fold around posts 18 and be secured tightly against its own face by remove ably engaging the male 34 and female 36 hook and loop fasteners to each other. The strap 40 could be over-sized in its length and areas covered by either male 34 or female 36 hook and loop fasteners to allow for adjustable positioning and hence minor tensioning adjustments of the elasticity of the bungee cord 26 (or a rope, webbing, ribbon, or wire) at different points of closure/fastening. Pulling harder would add tension and pulling less tightly would relieve tension. Alternatively, the strap 40 could be fitted with snaps or buttons and button-holes instead of hook and loop fasteners, also at varying intervals of closure to allow for minor tensioning. Alternatively, an s-hook fitting 6 or other contemplated variations of bungee cord/elastic rope 26 attachment fittings (carabiners and parachute buckles are also contemplated as viable attachment methods), could replace the need for a strap 40 and be instead engaged around posts 18 simply by hooking on, or buckling on.

The two side piece extensions 4 could be constructed of various different materials and combinations of materials and hence they can also take various contemplated shapes and forms. Their function or utility would be to wrap around the corners of the bumper connecting on one end to the vehicles wheel well or fender area and on their other end to the license plate frame affording the entire area protective cover from minor impacts. The inventor has contemplated constructing them differently for different budgets and price points, thereby being able to offer less and more expensive to manufacture alternatives to the public with a varying selection of appearances. Some preferred embodiments may use textile materials including EVA foam and neoprene either lined with fabric or not, as well as synthetic leathers such as vinyl and polyurethane fabrics. They could be made of rubber sheet goods as well as molded or heat formed foams. For economy the inventor has illustrated a most simplified version of the side piece extension 4, constructed out of a flexible hollow core foam extrusion tube/cylinder 8 made of a flexible elastomeric foam such as extruded EPE (Expanded polyethylene) similar to a pool noodle or pipe insulating jacket. This simple preferred embodiment illustrated in FIGS. 14 and 15 could utilize one continuous cut-to-size hollow core 38 foam extrusion 8 with or without a cut through slit along all or some of its length (to make assembly easier) or be made of several shorter hollow 38 foam extrusion sections 8 to be strung on a bungee cord or elastic rope 26 like a garland (this would be easier for sizing as no cutting would be necessary, and would also allow a more rigid denser foam to still conform to the vehicle's unique shape and contours). This hollow foam extrusion 8 need not be round as illustrated, but could instead have a rounded front and a flat back side or take any number of other extrude able shapes. The outer surface of this extrusion could be made smooth enough to apply an imprint to display a marketing message or personal embellishment. This hollow foam extrusion 8 or sections of hollow foam extrusion 8 could also be covered with a more visually appealing removable textile cover sleeve which could be adorned with a marketing message or personal embellishment.

In a preferred embodiment of the invention a bungee cord or elastic rope 26 which provides a wide range of stretch ability is cut-to-size by the installer prior to or after being strung through the hollow foam extrusion section or sections 8 and attached using a hog-tie or tied on with a knot to one end of an s-hook fitting 6. Properly sizing the bungee cord/elastic rope 26 length is critical to a proper installation. Too much tension caused by sizing the length too short and the guard will be difficult to connect and disconnect. Too little tension from oversizing the length and the guard will be loose and possibly fall off the side of the bumper. Once secured to the bungee cord 26, the s-hook fitting 6/bungee cord 26 connection area is covered and concealed with a slip-on small foam hollow core sleeve 30 to prevent scratching the vehicle where it may come into contact with a painted surface. This s-hook fitting attaches to the wheel well of a vehicle by engaging its exposed vinyl covered hook end 28 to the wheel well edge or any hole within the wheel well liner when present—thus creating a strong adjustable tension connection from the license plate frame posts 18 to the wheel well, ensuring a safe-to-drive while attached complete coverage bumper guard.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A vehicle bumper guard assembly adapted for use on a vehicle having a license plate and a bumper, said vehicle bumper guard assembly comprising:
    (a) a license plate frame, said license plate frame having at least one rigid lateral frame attachment structure and being adapted to receive and retain the license plate;
    (b) at least one lateral assembly, said at least one lateral assembly having a first end, a second end, and at least one pad;
    wherein the first end of the at least one lateral assembly comprises a first lateral assembly attachment means adapted to be removably attached to the at least one rigid lateral frame attachment structure of the license plate frame; and wherein the second end of the at least one lateral assembly comprises a second lateral assembly attachment means adapted to be removably attached to the vehicle; and wherein the at least one pad is disposed adjacent to the bumper of the vehicle.

2. The vehicle bumper guard assembly of claim 1 wherein the at least one frame attachment structure comprises a post.

3. The vehicle bumper guard assembly of claim 2 wherein the post is disposed substantially vertically on a lateral side of the license plate frame.

4. The vehicle bumper guard assembly of claim 1 wherein the at least one frame attachment structure comprises a first post and a second post.

5. The vehicle bumper guard assembly of claim 4 wherein the first post is disposed substantially vertically on a first lateral side of the license plate frame and the second post is disposed substantially vertically on a second lateral side of the license plate frame.

6. The vehicle bumper guard assembly of claim 1 wherein the license plate frame comprises at least one raised portion.

7. The vehicle bumper guard assembly of claim 1 wherein the license plate frame comprises a means for attaching the license plate frame to the vehicle.

8. The vehicle bumper guard assembly of claim 1 wherein the license plate frame comprises a means for attaching the license plate to the vehicle.

9. The vehicle bumper guard assembly of claim 1 wherein the license plate frame comprises foam.

10. The vehicle bumper guard assembly of claim 1 wherein the first lateral assembly attachment means comprises a hook.

11. The vehicle bumper guard assembly of claim 1 wherein the second lateral assembly attachment means comprises a hook.

12. The vehicle bumper guard assembly of claim 1 wherein the first lateral assembly attachment means comprises a hook and loop fastener.

13. The vehicle bumper guard assembly of claim 1 wherein the pad comprises foam.

14. The vehicle bumper guard assembly of claim 1 wherein first end of the at least one lateral assembly further comprises a tube.

15. The vehicle bumper guard assembly of claim 1 wherein the second end of the at least one lateral assembly further comprises a tube.

16. The vehicle bumper guard assembly of claim 1 wherein the at least one lateral assembly further comprises an elastomeric cord.

17. The vehicle bumper guard assembly of claim 1 wherein the distance between the first end and the second end of the at least one lateral assembly is adjustable.

18. The vehicle bumper guard assembly of claim 1 wherein the assembly is adapted to extend along substantially the entire bumper of the vehicle.

19. The vehicle bumper guard assembly of claim 1 further comprising a buckle.

* * * * *